United States Patent [19]

Hoffmann et al.

[11] 4,200,935
[45] Apr. 29, 1980

[54] PROCESS AND DEVICE FOR GENERATING STOCHASTICALLY CODED CONSTANTS

[75] Inventors: Jean-Claude Hoffmann; Francis Castanié, both of Toulouse; Henri Crabère, L'Union; Jean-Pierre Verdier, Cazeres; Norbert Voisin, Bruguieres, all of France

[73] Assignee: Societe Nationale Industrielle Aerospatiale, Paris, France

[21] Appl. No.: 956,966

[22] Filed: Nov. 2, 1978

[30] Foreign Application Priority Data

Nov. 9, 1977 [FR] France .................. 77 33774

[51] Int. Cl.² ........................... G06F 7/00
[52] U.S. Cl. .......................... 364/717
[58] Field of Search .......... 364/717; 331/78; 178/22; 307/260; 328/59

[56] References Cited

U.S. PATENT DOCUMENTS

| 3,720,910 | 3/1973 | McLaughlin et al. | 307/220 X |
|---|---|---|---|
| 3,725,677 | 4/1973 | Lawlor | 307/260 |
| 3,946,215 | 3/1976 | May | 364/717 |
| 3,961,169 | 6/1976 | Bishop et al. | 364/717 |
| 3,984,668 | 10/1976 | Zetterberg et al. | 364/717 |
| 4,047,008 | 9/1977 | Perkins | 364/717 |
| 4,142,240 | 2/1979 | Ward et al. | 364/717 |

OTHER PUBLICATIONS

Mitchell "Table-Lookup Methods for Generating Arbitrary Random Numbers" IEEE Trans. on Computers, vol. C-26, No. 10, Oct. 1977, pp. 1006-1008.

Primary Examiner—David H. Malzahn
Attorney, Agent, or Firm—Merriam, Marshall & Bicknell

[57] ABSTRACT

The invention relates to a process and device for simultaneously obtaining a plurality of stochastically coded constants, wherein a passive memory is programmed so that the number of logic 1 states of the bits, which belong to the same column of said memory and which correspond to different stored words, divided by the number of said columns, is equal to one of said constants, said memory is addressed by means of a random noise of probability equal to 0.5 and the random sequences of bits are taken from the memory column by column. The invention is applicable to the stochastic processing of information.

3 Claims, 2 Drawing Figures

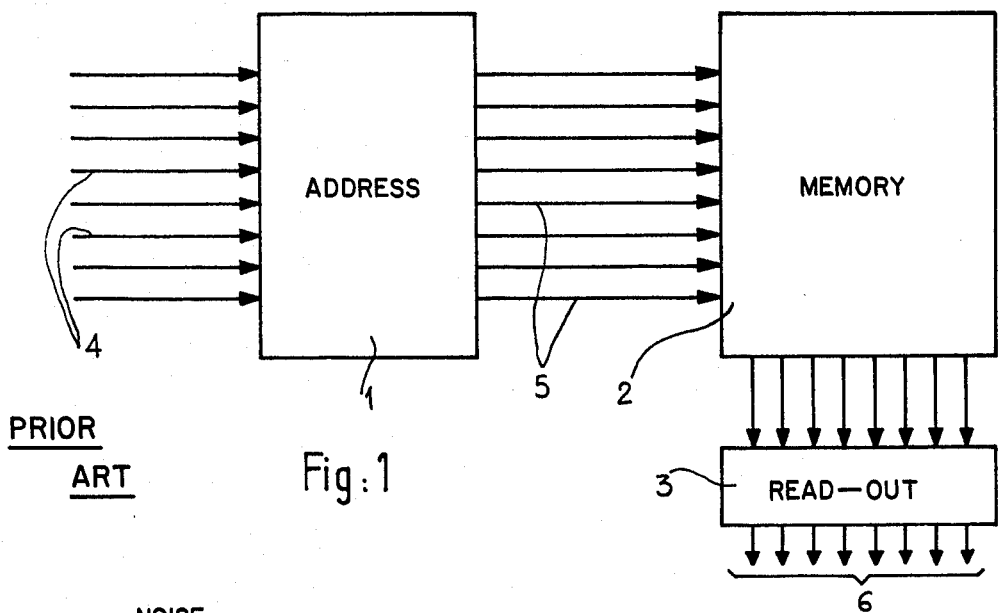
PRIOR ART
Fig: 1
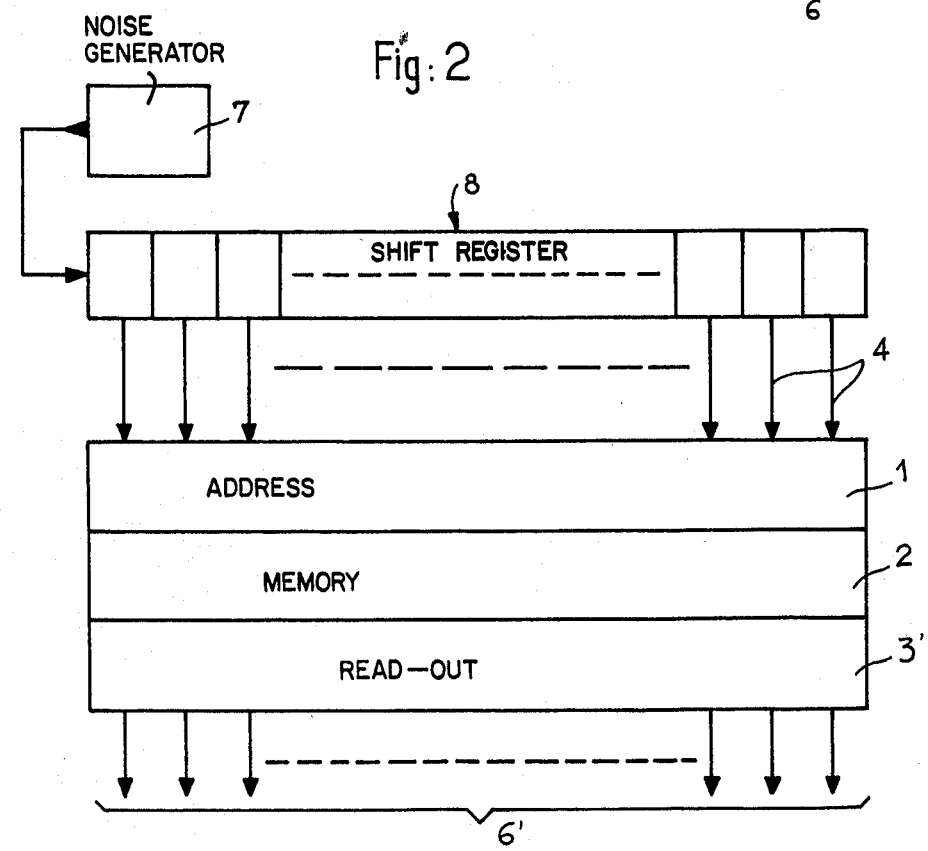
Fig: 2

PROCESS AND DEVICE FOR GENERATING STOCHASTICALLY CODED CONSTANTS

The present invention relates to a process and device for generating stochastically coded constants.

It is known that the stochastic coding of analog or digital information x consists in making a discrete random variable X, of which the statistical mean P is equal to x, correspond to this information.

A particular application of the principle is the case of X being binary, formed by 0 and 1 states; in this case, P represents the probability of having 1.

Such a stochastic coding is used in certain calculating and data converting devices, as well as for the transmission of information.

Devices for stochastically coding analog or digital information (or converters) are already known, comprising a comparator having two inputs or sets of inputs, one of which receives said information or constant and the other a random noise of the same nature (i.e. analog or digital) coming from a noise generator. Such a noise generator is constituted by a source of noise such as a resistor, a noise diode, a Zener diode, etc.

Thus, a stochastically coded magnitude is in the form of a sequence of pulses, these pulses being such that their temporal mean is equal to the initial magnitude before coding.

Therefore, when a constant is needed in stochastic calculation, a continuous electric magnitude, such as a voltage, is usually firstly produced, representative of the constant to be coded, then this electric magnitude is subjected to an analog-stochastic converter of the type described hereinabove.

Such a process presents the drawback, when a plurality of stochastic constants is desired, of requiring as many analog-stochastic converters as constants to be obtained, this complicating the stochastic calculating device comprising said converters and increasing the cost thereof.

It is an object of the present invention to remedy this drawback. It relates to a process and a device for producing a plurality of stochastically coded constants, simply and inexpensively.

To this end, according to the invention, the process for simultaneously obtaining a plurality of stochastically coded constants is noteworthy in that a passive memory is programmed so that the number of the logic 1 states of the bits, which belong to the same column of said memory and which corresponds to different stored words, divided by the number of lines of said columns, is equal to one of said constants, in that said memory is addressed by means of an equiprobable address generator and in that the random sequencies of bits are taken from the memory column by column.

Thus, each of said random sequences constitutes the stochastic code of the constant determined by the ratio of the number of logic 1 states of a column to the number of lines thereof.

To carry out this process, the device according to the invention is noteworthy in that it comprises on the one hand a programmable memory of known type in which logic zeros and ones may be inscribed distributed in lines and columns and with which are associated addressing means and read out means and, on the other hand, a random noise generator of probability equal to 0.5 controlling said addressing means, and in that said read out means supply at their output the contents of each of said columns of the memory.

Thus, the device according to the invention may supply as many stochastic constants as the words stored in said memory comprise bits, each stochastic constant having for value the ratio of the sum of the ones of a column with respect to the number of lines thereof. If the content of the memory is N words, each of n bits, the device may produce n stochastic constants of which the values range from 0 to N, with a pitch of 1/N.

A shift register is preferably disposed between the random noise generator and the addressing means, which shift register controls said addressing means.

The invention will be more readily understood on reading the following description with reference to the accompanying drawings, in which:

FIG. 1 schematically illustrates the normal functioning of a known read-only memory.

FIG. 2 schematically shows a device according to the invention for generating stochastic constants.

Referring now to the drawings, FIG. 1 shows a known programmable read-only memory which comprises addressing circuits 1 (or address decoding circuits), a programmed passive memory 2 and read-out or output circuits 3.

The addressing circuits 1 receive their information from the address lines 4 and they comprise a logic enabling them, by combining the bits of said address lines, to determine the lines 5 for selecting the words of memory 2. The latter comprises bit locations, disposed in lines and in columns, and these locations may take and/or keep the 0 state or the 1 state under the effect of a voluntary action (for example destruction of an electronic component).

The read-out or output circuits 3 allow the output signals of the memory 2 to be adapted to outside user circuits, particularly concerning the level, power, etc.

In such a known unit, the bits of the address words and the output words are each given a specific weight which determines their place in the word. This results in that a binary output word, available at the outputs 6 of the read-out circuits 3, is formed by the ordered bits of a line of the memory. This is particularly so, due to the digital value of such a word being obtained by the sum of the weights of the ones of the same line of the memory.

For example, in the much simplified case of a memory with three bits, the correspondence of the address words and the output words may be as follows:

| Address words | Output words |
|---|---|
| 000 | 111 |
| 001 | 100 |
| 010 | 011 |
| 011 | 100 |
| 100 | 101 |
| 101 | 101 |
| 110 | 101 |
| 111 | 100 |

Therefore, if the address lines 4 receive the address 000, the outputs 6 will supply the binary words 111, corresponding to the decimal weight value 7 (sum of the weights 4+2+1) of the logic ones.

This well known functioning of the passive programmable memories has been recalled merely to render the invention more comprehensible.

The device according to the invention, shown in FIG. 2, comprises, like the unit of FIG. 1, address means 1 and a programmable passive memory 2. This memory is programmed (for example by destruction of an electronic component), so that the number of logic ones which are located in each of its columns is such that, divided by the number of said columns, it gives a desired constant. Read-out means 3' are associated with this memory 2, which are capable of delivering the contents of the columns of memory 2, on their outputs 6' (and no longer the contents of the lines).

The device according to the invention further comprises a random noise generator 7 of probability equal to 0.5 supplying a shift register 8, of which the outputs supply the address lines 4. Consequently, the address lines are energized at random, but equiprobably.

Thus, if it is assumed that the programming of the memory 2 of the device of FIG. 2 is the same as that given by the following table corresponding to memory 2 of the device of FIG. 1, at a given moment, the following combination of address selection may for example be obtained:

| Address words | Words of the memory |
|---|---|
| 010 | 011 |
| 000 | 111 |
| 100 | 101 |
| 111 | 100 |
| 001 | 100 |
| 110 | 101 |
| 011 | 100 |
| 101 | 101 |

Furthermore, instead of obtaining, as in the device of FIG. 1, the words of the memory at the output, the contents of the columns of said words, i.e. 01111111, 11000000 and 11100101, respectively, will be obtained on the outputs 6'.

The first column (or left-hand column) comprises seven logic ones with a maximum possibility of eight (eight lines). It therefore supplies the stochastic constant $7/8$.

In the same way, the other two columns correspond respectively to the stochastic constants 2/8 and $5/8$.

It is therefore easily seen that if the capacity of the memory 2 is 256 words, each of 8 bits, it is possible to obtain 8 stochastic constants each of which may vary from 0 to 1 by pitch of 1/256.

It will be noted that the programming of the memory 2 with a view to generating stochastic constants (FIG. 2) is much simpler than when this memory is used digitally (FIG. 1). In fact, it suffices that the number of ones of a column corresponds to the desired constant, the location of these ones not being imposed. They may be distributed at the beginning or end of a column, or at random.

We claim:

1. A process for obtaining a plurality of stochastically coded constants, comprising the steps of:
    programming a passive memory with a plurality of words each formed of bits consisting of logic ones and zeros,
    said words being arranged in lines with said bits in columns, the ratio of the number of logic ones appearing in a column to the total number of said lines being equal to one of said constants,
    addressing said memory by means of an equiprobable address generator, and
    reading from the memory the sequences of bits column by column.

2. A device for obtaining a plurality of stochastically coded constants comprising:
    a programmable memory adapted to store logic ones and zeros arranged in lines and columns;
    addressing means for addressing said memory;
    a random noise generator of probability equal to 0.5 for controlling said addressing means, and
    read-out means for reading the contents of each of said columns in the memory.

3. A device as claimed in claim 2, further comprising between the random noise generator and the addressing means, a shift register which controls said addressing means.

* * * * *

UNITED STATES PATENT AND TRADEMARK OFFICE
CERTIFICATE OF CORRECTION

PATENT NO. : 4,200,935
DATED : April 29, 1980
INVENTOR(S) : JEAN-CLAUDE HOFFMANN ET AL.

It is certified that error appears in the above-identified patent and that said Letters Patent are hereby corrected as shown below:

Col. 1, line 51, "corresponds", should be --correspond--.

Col. 2, line 63, "words", should be --word--.

Col. 2, line 64, "weight", should be --digital--.

Signed and Sealed this

Third Day of February 1981

[SEAL]

Attest:

RENE D. TEGTMEYER

Attesting Officer  Acting Commissioner of Patents and Trademarks